United States Patent
Bales et al.

(10) Patent No.: US 11,461,746 B1
(45) Date of Patent: Oct. 4, 2022

(54) BLOCK CHAIN RECORDATION OF IN-KIND PAYMENTS

(71) Applicant: T-Mobile Innovations LLC, Overland Park, KS (US)

(72) Inventors: Mark R. Bales, Lee's Summit, MO (US); Craig A. Lee, Overland Park, KS (US); Alberto Lorente, Kansas City, MO (US); Lyle W. Paczkowski, Mission Hills, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 543 days.

(21) Appl. No.: 15/844,500

(22) Filed: Dec. 15, 2017

(51) Int. Cl.
*G06Q 20/10* (2012.01)
*G06Q 20/32* (2012.01)
*H04L 67/104* (2022.01)
*H04L 9/06* (2006.01)
*G06Q 30/06* (2012.01)
*G06Q 20/40* (2012.01)

(52) U.S. Cl.
CPC ......... *G06Q 20/10* (2013.01); *G06Q 20/3223* (2013.01); *G06Q 20/3278* (2013.01); *G06Q 20/405* (2013.01); *G06Q 30/06* (2013.01); *H04L 9/0637* (2013.01); *H04L 9/0643* (2013.01); *H04L 67/104* (2013.01)

(58) Field of Classification Search
CPC ............ G06Q 20/223; G06Q 20/3224; G06Q 20/407; H04B 5/00; H04M 1/72552; H04W 12/00503; H04W 4/029; H04L 9/32
See application file for complete search history.

(56) References Cited

U.S. PATENT DOCUMENTS 7,764,946 B1 * 7/2010 Sennett ............... H04W 4/90
455/404.1
8,176,431 B1 * 5/2012 Scannell ............ G06Q 30/0643
715/810

(Continued)

FOREIGN PATENT DOCUMENTS

CA   WO2013071425 A1    5/2013
WO   WO-2014108762 A2 * 7/2014  ............. G06Q 30/02

OTHER PUBLICATIONS

Bales, Mark R., et al., "Mobile Communication Device In-Kind Payment Verification," filed Dec. 15, 2017, U.S. Appl. No. 15/844,496.

(Continued)

*Primary Examiner* — Neha Patel
*Assistant Examiner* — Jahed Ali

(57) ABSTRACT

A method recording in-kind payments from a wireless communication service account. The method comprises building a block-chain associated with a wireless communication service account by an application executing on a computer system, where the block-chain encapsulates logic instructions, building a first block recording a first in-kind payment by the application based on executing the logic instructions encapsulated in the block-chain, where the first block comprises a first plurality of event records, a first nonce value, and a first hash value based on a hash value from a preceding block, on the first plurality of event records, and the first nonce value, and sending an in-kind payment authorization message to a wireless communication service billing system, whereby the first in-kind payment is committed.

13 Claims, 10 Drawing Sheets

(56) References Cited

U.S. PATENT DOCUMENTS

| | | | |
|---|---|---|---|
| 8,873,589 B2* | 10/2014 | Aweya | H04J 3/0667 370/509 |
| 9,448,308 B2* | 9/2016 | Burroughs | G01S 19/258 |
| 9,465,650 B2* | 10/2016 | Meng | G06F 9/466 |
| 9,699,606 B1* | 7/2017 | Bhatia | G06Q 10/083 |
| 10,251,053 B1* | 4/2019 | Paczkowski | H04W 8/22 |
| 10,650,123 B2* | 5/2020 | Mintz | G06F 21/105 |
| 2006/0123117 A1* | 6/2006 | Heutchy | H04L 67/38 709/227 |
| 2011/0101095 A1* | 5/2011 | Bales, Jr. | G06Q 20/206 235/382 |
| 2011/0184640 A1* | 7/2011 | Coleman | G01C 21/3492 701/533 |
| 2011/0196797 A1* | 8/2011 | Liwerant | G06Q 20/32 705/71 |
| 2011/0238513 A1 | 9/2011 | Naccache et al. | |
| 2012/0116957 A1* | 5/2012 | Zanzot | G06Q 40/00 705/39 |
| 2012/0159267 A1* | 6/2012 | Gyorffy | G06F 11/0709 714/E11.024 |
| 2012/0209732 A1* | 8/2012 | Jeong | G06Q 20/3224 705/26.1 |
| 2012/0239572 A1* | 9/2012 | Wolfs | G06Q 20/1085 705/44 |
| 2012/0252489 A1* | 10/2012 | Meredith | G01S 5/0252 455/456.1 |
| 2012/0316963 A1* | 12/2012 | Moshfeghi | G06Q 20/327 705/14.58 |
| 2013/0036000 A1* | 2/2013 | Giordano | G06Q 20/385 705/14.27 |
| 2013/0091452 A1* | 4/2013 | Sorden | G06T 17/05 715/771 |
| 2014/0025576 A1 | 1/2014 | Esch | |
| 2014/0129428 A1* | 5/2014 | Tyler | G06Q 30/06 705/39 |
| 2014/0279123 A1* | 9/2014 | Harkey | G06Q 30/0619 705/26.1 |
| 2014/0279518 A1* | 9/2014 | Acuna-Rohter | G06Q 20/4016 705/44 |
| 2014/0310126 A1* | 10/2014 | Baazov | H04W 48/04 705/26.25 |
| 2014/0310240 A1* | 10/2014 | Meng | G06F 9/466 707/615 |
| 2015/0039506 A1* | 2/2015 | Groarke | G06Q 20/401 705/44 |
| 2015/0161585 A1 | 6/2015 | Huster | |
| 2015/0382137 A1* | 12/2015 | Prehn | H04W 4/02 455/456.3 |
| 2016/0092872 A1* | 3/2016 | Prakash | G06Q 20/322 705/65 |
| 2016/0092988 A1* | 3/2016 | Letourneau | G06Q 20/363 705/66 |
| 2016/0252576 A1* | 9/2016 | Tofighbakhsh | G01R 31/31712 702/125 |
| 2016/0283884 A1* | 9/2016 | Wilson | G06Q 50/01 |
| 2017/0091699 A1* | 3/2017 | Mueller | H04L 67/18 |
| 2017/0193505 A1* | 7/2017 | Erhart | G06Q 20/405 |
| 2017/0207988 A1* | 7/2017 | Li | H04L 47/24 |
| 2017/0214573 A1* | 7/2017 | Linsky | H04W 8/005 |
| 2017/0243215 A1* | 8/2017 | Sifford | H04L 9/3236 |
| 2017/0323294 A1* | 11/2017 | Rohlfing | G06Q 20/3674 |
| 2018/0192297 A1* | 7/2018 | Chadaga | H04W 16/20 |
| 2019/0182614 A1* | 6/2019 | Monogioudis | G01S 5/0294 |
| 2019/0355015 A1* | 11/2019 | Dashevskiy | H04W 4/23 |
| 2019/0392119 A1* | 12/2019 | Rahiman | H04L 9/3239 |
| 2021/0168567 A1* | 6/2021 | Mouline | H04W 4/90 |

OTHER PUBLICATIONS

FAIPP Pre-Interview Communication dated Feb. 6, 2020, U.S. Appl. No. 15/844,496, filed Dec. 15, 2017.

FAIPP Office Action dated May 4, 2020, U.S. Appl. No. 15/844,496, filed Dec. 15, 2017.

Final Office Action dated Feb. 23, 2021, U.S. Appl. No. 15/844,496, filed Dec. 15, 2017.

Advisory Action dated Apr. 7, 2021, U.S. Appl. No. 15/844,496, filed Dec. 15, 2017.

Office Action dated Oct. 4, 2021, U.S. Appl. No. 15/844,496, filed Dec. 15, 2017.

F.S. Park, C. Gangakhedkar and P. Traynor, "Leveraging Cellular Infrastructure to Improve Fraud Prevention," 2009 Annual Computer Security Applications Conference, 2009, pp. 350-359, doi: 10.1109/ACSAC. 2009.40. (Year: 2009).

Final Office Action dated Jun. 23, 2022, U.S. Appl. No. 15/844,496, filed Dec. 15, 2017.

\* cited by examiner

BLOCK CHAIN RECORDATION OF IN-KIND PAYMENTS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Some wireless communication service providers support in-kind payments from a first wireless communication subscription account to a second wireless communication subscription account. Sometimes the in-kind payment can be made from a subscription account with a first wireless communication service provider to a different subscription account with a second wireless communication service provider, for example where the first wireless communication service provider provides communication services in a first nation and the second wireless communication service provider provides communication services in a second nation. This may involve the first wireless communication service provider and the second wireless communication service provider having methods for transferring money between escrow accounts. In-kind payments may involve topping up pre-paid communication service balances or post-paid communication service balances, which may be referred to in some contexts as airtime remittances.

SUMMARY

In an embodiment, a method of recording in-kind payments from a wireless communication service account is disclosed. The method comprises building a foundation block associated with in-kind payments from a wireless communication service account by an application executing on a computer system, where the foundation block comprises in-kind payment authorization logic instructions and a hash value determined over at least the in-kind payment authorization logic, receiving a request to make an in-kind payment from the wireless communication service account by the application, and creating a payment block associated with the wireless communication service account by the application. The method further comprises receiving a message by the application, where the message is related to the requested in-kind payment and comprises a network time value, looking up a network time value by the application from a wireless communication network time source, and executing the in-kind payment authorization logic instructions by the application to compare the network time value in the message related to the requested in-kind payment to the network time value looked up by the application. The method further comprises, based on executing the in-kind payment authorization logic instructions, sending an in-kind payment authorization by the application, whereby the wireless communication service account is debited by the amount of the in-kind payment, determining a payment block hash by the application based on the event record that contains the network time, based on a hash of a preceding block, and based on a nonce value of the payment block, and completing the payment block by adding the payment block hash to the payment block by the application.

In another embodiment, a method of recording in-kind payments from a wireless communication service account is disclosed. The method comprises building a block-chain associated with a wireless communication service account by an application executing on a computer system, where the block-chain encapsulates logic instructions, building a first block recording a first in-kind payment by the application based on executing the logic instructions encapsulated in the block-chain, where the first block comprises a first plurality of event records, a first nonce value, and a first hash value based on a hash value from a preceding block, on the first plurality of event records, and the first nonce value, and sending an in-kind payment authorization message by the application to a wireless communication service billing system, whereby the first in-kind payment is committed. The method further comprises building a second block recording a second in-kind payment by the application based on executing the logic instructions encapsulated in the block-chain, where the second block comprises a second plurality of event records, a second nonce value, and a second hash value based on a hash value from a preceding block, on the second plurality of event records, and the second nonce value, and, based on executing the logic instructions in the context of the second plurality of event records, sending an in-kind payment rejection message by the application to the wireless communication service billing system, whereby the second in-kind payment is interrupted.

In yet another embodiment, a computer system is disclosed. The computer system comprises a processor, a non-transitory memory, and an application stored in the non-transitory memory. When executed by the processor the application builds a foundation block associated with in-kind payments from a wireless communication service account by an application executing on a computer system, where the foundation block comprises in-kind payment authorization logic instructions and a hash value determined over at least the in-kind payment authorization logic, receives a request to make an in-kind payment from the wireless communication service account by the application, and creates a payment block associated with the wireless communication service account by the application. When executed by the processor, the application further executes the in-kind payment authorization logic instructions by the application, where the in-kind payment authorization logic instructions identify conditions of in-kind payment actions when network time is to be captured and identify conditions for authorizing in-kind payment from the wireless communication service account, based on executing the in-kind payment authorization logic instructions, looks up a network time by the application from a wireless communication network time source, and adds the network time to an event record of the payment block by the application. When executed by the processor, the application further sends an in-kind payment authorization by the application, whereby the wireless communication service account is debited by the amount of the in-kind payment, determines a payment block hash by the application based on the event record that contains the network time, based on a hash of a preceding block, and based on a nonce value of the payment block, and completes the payment block by adding the payment block hash to the payment block by the application, whereby the application records in-kind payments from a wireless communication service account.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
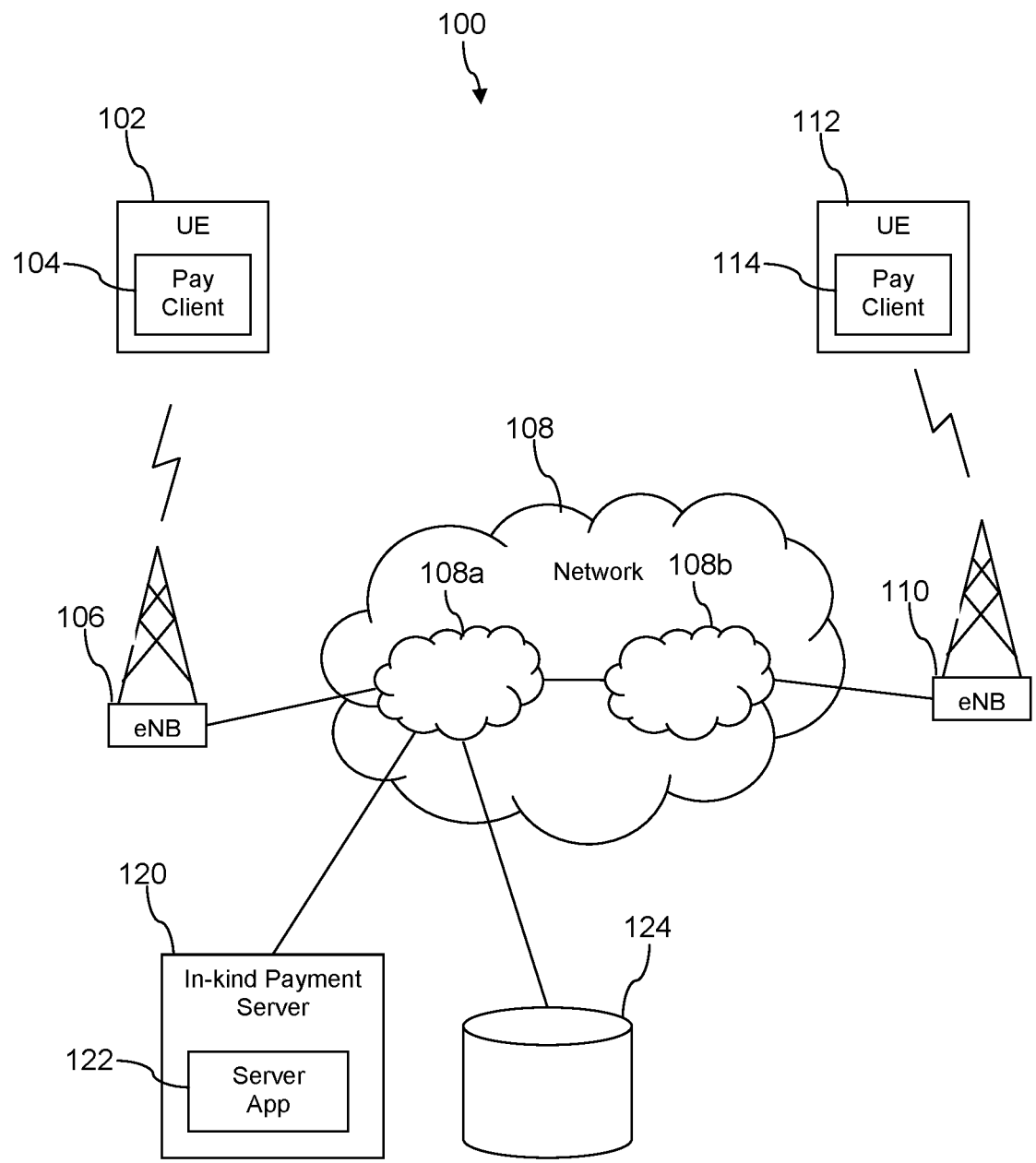
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A system for recording in-kind payments in wireless communication service accounts is taught herein. As used herein, an in-kind payment refers to a payment or transfer of payment in the form of a good rather than in the form of money or cash, where the good specifically is a communication service or a balance in a communication service account. While the balance in a communication service account that received an in-kind payment may be represented in a currency amount, this currency amount can only be used to pay for communication services and cannot be converted to currency and removed from the communication service account. A person using a mobile communication device may transfer value from his or her post-paid wireless communication service account to a wireless communication service account with a different wireless communication service provider, possibly with a service provider located in a different country. For example, a young man in the United States may transfer in-kind payment from his wireless communication service account in the US to his mother's wireless communication service account in Mexico. Alternatively, the in-kind payment may be transferred from the sender's post-paid wireless communication service account to another third party (e.g., not a wireless communication service provider) that is a trusted financial institution or mediator, and the third party may then transfer the in-kind payment to the wireless communication service account of the receiver or to a different financial account of the receiver, such as to an electric utility bill account of the receiver, to a gas utility bill account of the receiver, to a water utility bill account of the receiver, or other account of the receiver.

In-kind payments in wireless communication service accounts may be vulnerable to identity theft or other fraud. For example, a first mobile communication device spoofing a legitimate device may authorize transfer of in-kind payment from a wireless communication service account associated with the legitimate device to a second service account of a second mobile communication device, and the transferred in-kind payment may then be liquidated out of the second service account to prevent recovery of the fraudulently transferred in-kind payment. This kind of in-kind payment fraud can be repeated over and over again many times before the fraud comes to the attention of the subscriber associated with the legitimate device. Detecting this fraud, stopping the fraud, and possibly recovering fraudulently transferred in-kind payments is complicated when the in-kind payment is made from subscription service account with a first wireless communication service provider to a subscription service account with a second different wireless communication service provider and may be complicated yet further when the first and second wireless communication service providers are located and operate in different countries. Additionally, the subscriber himself or herself may accidently key in the wrong phone number of a destination of an in-kind payment and not realize the error until the in-kind payment has been transmitted to an unintended recipient and may then be unrecoverable. On the other end, the intended recipient, for example the subscribers mother, may be waiting for arrival of the in-kind payment and be making plans on the assumption the in-kind payment will take place as expected. When the in-kind payment does not happen, this can be a hardship for the expectant intended recipient.

An in-kind payment client application executing on a mobile communication device may provide a variety of in-kind payment functionality. The user may execute the client application to designate the amount of in-kind payment to be transacted and to designate the receiving mobile communication device and/or receiving service account. This client application can interact with the wireless communication service provider of that user, or to a third party mediator, to initiate the in-kind payment transaction. In an embodiment, the client application may take steps to verify that the in-kind payment has been completed successfully or that the in-kind payment goes to the right mobile communication device or right service account. For further details on verification of in-kind payment by mobile communication devices see U.S. patent application Ser. No. 15/844,496 filed Dec. 15, 2017, entitled "Mobile Communication Device In-kind Payment Verification," by Mark R. Bales, et al., which is incorporated herein by reference in its entirety.

The in-kind payment client application may further coordinate with a server in the wireless service provider's network to build a block-chain recording in-kind payment transactions. This block-chain can be used, in part, to provide an authoritative (e.g., trusted and uncorrupted) record of in-kind payment transactions which can be used to prevent fraud and to investigate fraud related to in-kind payment transactions. A separate block-chain may be created for each mobile communication device that installs the in-kind payment transaction client application. When the client application initiates and completes an in-kind payment, a new block is created and added to the block-chain, where the new block records one or more events associated with the in-kind payment. The client application creates event recordation request messages containing event information and sends these event recordation request messages to the service provider server, and the service provider server adds information to the new block (the new block may be constructed over time to store information or data about a plurality of events associated with a single in-kind payment transaction). When the in-kind payment is completed, the server completes construction of the block and attaches it to the block-chain. For example, when the in-kind payment is completed, the server calculates a hash over a hash of the previous block in the block-chain, over the event data, and over a nonce of the new block, adds this hash to the block, and links the new block to the previous block in the block-chain.

The in-kind payment client application may execute a method provided by the client application to look-up network time and include the network time in the event recordation request message. As is understood by those skilled in the art, "network time" is different from epoch time which is a world-wide computer time having a consensus value. "Network time" is a value that is relative to a specific communication service provider's network and is not a consensus value. Additionally, "network time" is a very precise value and defines time to a precision of a fraction of a second having many significant figures. As a consequence, the likelihood that epoch time would agree with a specific network time stamp is very low. The server builds the network time provided by the in-kind payment client application into the in-progress (e.g., under construction) new block. The server may also, depending on executable logic, programming instructions, if-then-else statements, or other rules, compare the network time provided by the in-kind payment client application to a value of network time that the server looks up. If there is insufficient agreement between the two values of network time, the server may cancel the in-progress in-kind payment transaction and complete the in-progress new block. This may happen, for example, if a bogus device has attempted to spoof the in-kind payment client with some malware. The malware would not have access to network time and hence could not supply the time value to the needed precision. Said in other words, the use of the network time is a form of authentication that the in-kind payment transaction is being initiated by an authorized device and can prevent some spoofing attempts that might initiate an in-kind payment from a subscription account to an unintended recipient account. Network time may be looked-up by the in-kind payment client application from a time source provided by the wireless communication service provider to properly authenticated and authorized entities, such as the in-kind payment client application and the server application.

When the server application creates an in-kind payment block-chain, the first block is a foundation block. The foundation block may contain one or more logic instructions that the server application executes in response to receiving event recordation request messages from the in-kind payment client application. These logic instructions may be different for different mobile communication devices (i.e., different in-kind payment client applications associated with different wireless communication service subscribers). When an in-kind payment client application is first installed and initiated by a user, various configuration options may be selected or deselected by the user. These configuration options may relate to what security checks on in-kind payment transactions are desired by the user to be performed. These configuration options can drive the creation and inclusion of logic instructions in the foundation block. Other logic instructions may be created by the server application based on the kind of wireless communication service account is associated with the in-kind payment client application. For example, some service accounts may be more trustworthy and/or credit worthy than other accounts, and this may drive inclusion or omission of logic instructions in the foundation block.

It will be appreciated that the system described herein is an improvement of a complicated, real-time computer system. The system is configured to manage in-kind payments initiated by tens of thousands, hundreds of thousands, millions, or more mobile communication devices in real-time, more specifically to build and maintain the recordation of such in-kind payments using separate block-chains for each different in-kind payment client application (hence, for each different mobile communication device). The event recordation messages are data communication messages sent by a logical processor of the mobile communication device (the in-kind payment client application executes on a processor in the mobile communication device) to a server application executed by a logical processor of a server computer.

Turning now to FIG. 1, a communication system 100 is described. In an embodiment, the system 100 comprises a first mobile communication device (user equipment [UE]) 102 that executes a first in-kind payment client application 104 and that receives a wireless communication link from a first cell site 106. The first mobile communication device 102 may be a mobile phone, a smart phone, a personal digital assistant (PDA), a headset computer, a wearable computer, a laptop computer, a notebook computer, a tablet computer, or other mobile communication device. The first cell site 106 may provide a wireless link to the first device 102 according to a long term evolution (LTE), a code division multiple access (CDMA), a global system for mobile communication (GSM), or a worldwide interoperability for microwave access (WiMAX) wireless communication protocol. The first cell site 106 may communicatively couple the first mobile communication device 102 to a network 108. The network 108 comprises one or more public networks, one or more private networks, or a combination thereof. In an embodiment, the network 108 comprises a first communication network 108a operated by a first wireless communication service provider and a second communication network 108b operated by a second, different wireless communication service provider. The first cell site 106 may be communicatively coupled to the network 108 specifically by a communication connection to the first communication network 108a. In an embodiment, the first communication network 108a is located in a first country and the second communication network 108b is located in a second, different country.

The system 100 further comprises a second mobile communication device (UE) 112 that executes a second in-kind payment client application 114 and that receives a wireless communication link from a second cell site 110. The second mobile communication device 112 may be a mobile phone, a smart phone, a personal digital assistant (PDA), a headset computer, a wearable computer, a laptop computer, a notebook computer, a tablet computer, or other mobile communication device. The second cell site 110 may provide a wireless link to the second device 112 according to a long term evolution (LTE), a code division multiple access (CDMA), a global system for mobile communication (GSM), or a worldwide interoperability for microwave access (WiMAX) wireless communication protocol. The second cell site 110 may communicatively couple the second mobile communication device 112 to the network 108. In an embodiment, the second cell site 110 may be communicatively coupled to the network 108 specifically by a communication connection to the second communication network 108b.

The user of the first device 102 may initiate an in-kind payment from a first wireless communication service account associated with the first device 102 to a second wireless communication service account associated with the second device 112. This may involve a transfer of value from a first wireless communication service provider that operates the first communication network 108a to a second wireless communication service provider that operates the second communication network 108b, for example debiting the first wireless communication service account controlled by the first wireless communication service provider and crediting the second wireless communication service account controlled by the second wireless communication service provider. This in-kind payment transaction may pass from the first wireless communication service provider to a third party mediator or trusted financial institution, and from the third party mediator to the second wireless communication service provider or to another financial account associated with the user of the second mobile communication device 112, for example to an electric utility account, to a gas utility account, to a water utility account, or some other service account.

To make an in-kind payment, the user may interact with the first in-kind payment client application 104 that executes on the first device 102. The user may provide inputs to the first client application 104 that identifies a recipient of the in-kind payment as the second mobile communication device 112 (or the second wireless communication service account associated with the second device 112) and identifies an amount of in-kind payment. The user of the first device 102 may key in a telephone number of the second device 112. Alternatively, the user of the first device 102 may select an entry in a contacts list of the first device 102 which designates the second device 112.

The user may further provide an input identifying what form of in-kind payment to complete from among a plurality of different possible in-kind payments. For example, an in-kind payment may be a transfer of credit to a standard wireless communication service account (e.g., for standard voice and standard data wireless communication service, also known as an airtime remittance), a transfer of credit to a pay-per-view video service, a transfer of credit to a premium communication service (e.g., a right to access premium communication service such as live streaming of World Cup Soccer games), or other. An in-kind payment may be identified as a payment to an electric utility account, to a gas utility account, to a water utility account, to a credit card account, to a grocery bill account.

The first in-kind payment client application 104 may then send an in-kind payment request message to an in-kind payment server 120 that executes an in-kind payment server application 122, where the in-kind payment server 120 is communicatively connected to the first communication network 108a and controlled by the first wireless communication service provider. The in-kind payment server application 122 may interwork with the second wireless communication service provider to transfer value to the second wireless communication service account associated with the second device 112. Alternatively, the in-kind payment server application 122 may interwork with a third party mediator to transfer value to the third party mediator, and the third party mediator may then transfer value to the second wireless communication service account or to some other utility account or financial account associated with the user of the second device 112.

The in-kind payment server application 122 may execute predefined in-kind payment authorization logic and make or reject in-kind payments based on the execution of the logic. To record events and processing steps of in-kind payments, the in-kind payment server application 122 may create, maintain, extend, and examine in-kind payment recordation block-chains. The in-kind payment application 122 may store a plurality of in-kind payment block chains in a data store 124. The data store 124 may comprise tens of thousands of in-kind payment recordation block-chains, hundreds of thousands of in-kind payment recordation block-chains, or millions of in-kind payment recordation block-chains.

Figure 2:
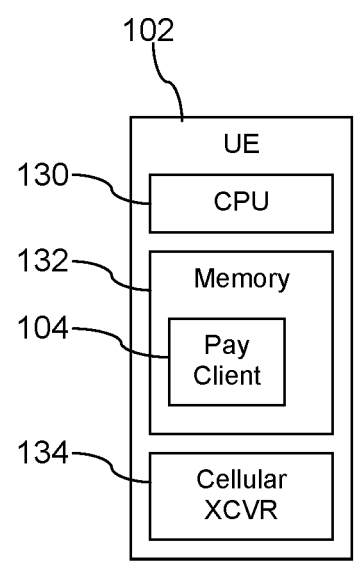
FIG. 2 is a block diagram of a mobile communication device according to an embodiment of the disclosure.

Turning now to FIG. 2, further details of the first mobile communication device 102 are described. The first device 102 comprises a processor 130, a non-transitory memory 132, and a cellular radio transceiver 134. The first in-kind payment client application 104 is stored in the non-transitory memory 132 and may be executed by the processor 130. The second device 112 may have a structure similar to that illustrated and described with reference to FIG. 2.

Figure 3:
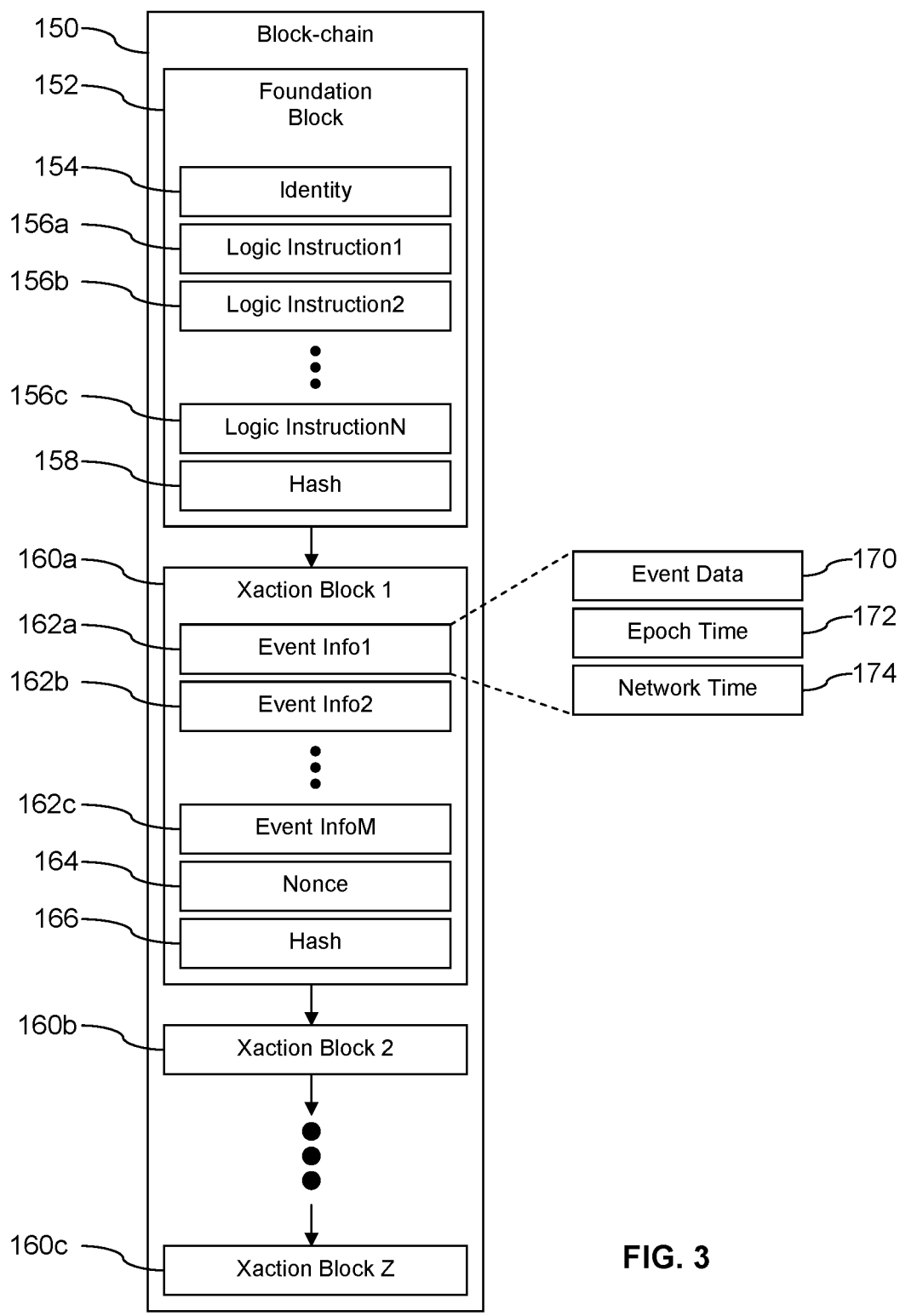
FIG. 3 is an illustration of a block-chain according to an embodiment of the disclosure.

Turning now to FIG. 3, a block-chain 150 according to an embodiment is described. The in-kind payment server application 122 may build, maintain, extend, and examine the block-chain 150. The server application 122 may store the block-chain 150 in the data store 124. The block-chain 150 comprises a foundation block 152 and a plurality of transaction blocks 160, for example a first transaction block 160a, a second transaction block 160b, and a third transaction block 160c. It is understood that a block-chain 150 may comprise any number of transaction blocks 160. The foundation block 152 may comprise an identity 154, and one or more logic instructions 156. While the foundation block 152 is illustrated as having a first logic instruction 156a, a second logic instruction 156b, and a third logic instruction 156c, it is understood that the foundation block 152 may comprise any number of logic instructions 156. The identity 154 identifies the mobile communication device 102, a mobile communication service subscription account, or a user. The foundation block 152 further comprises a hash 158 calculated over the identity 154 and the logic instructions 156. A hash is a fixed length digital word (for example 8 bytes, 16 bytes, 20 bytes, 32 bytes, or some other number of bytes) that is calculated using a hashing function such as MD5 SHA-1, SHA-2, or some other hashing function. In an embodiment, the foundation block 152 may further comprise a nonce value, and the hash 158 may be calculated over the identity 154, the logic instructions 156, and the nonce. In an embodiment, the nonce value may be found through a trial and error process such that the hash 158 has a particular value characteristic, such as that the hash 158 has a certain number of leading '0's. Some of the logic instructions 156 may be deleted after the block chain 150 has been extended with one or more transaction blocks 160. Other logic instructions 156 may be added after the block chain 150 has been extended with one or more transaction blocks 160.

The transaction blocks 160 comprise event information 162, a nonce 164, and a hash that is calculated over the nonce 164, over the event information 162, and over a hash value of the preceding block in the block-chain 150. The event information 162 may comprise event data 170, an epoch time 172 associated with the event data 170, and a network time 174 associated with the event data 170. The event information 162 may comprise other information. As in-kind payment transactions are completed by the mobile communication device 102 and/or by the in-kind payment client application 104, transaction blocks 160 are created, built, extended, completed, and linked into the block-chain 150 by the server application 122. It is understood that while a new transaction block 160 is under construction (in progress of being built) the nonce 164 and hash 166 may not have been determined. The nonce 164 and hash 166 may be determined after the in-kind payment transaction has been completed. When a new transaction block 160 has been completed, it is linked into the block-chain 150. In FIG. 3, the links between blocks 152, 160 are suggested by arrows. It is understood that the server application 122 may create a block-chain 150 for each mobile communication device 102 that is provisioned with an in-kind payment client application 104. The block-chain 150 may be preserved at least for the lifetime of the installation of the in-kind payment client application 104 on the mobile communication device 102 and may be preserved over the lifetime of multiple devices 102. For example, as user upgrades and replaces a first mobile communication device with a second mobile communication device, the block-chain 150 may be associated with the replacement device.

Figure 4A:
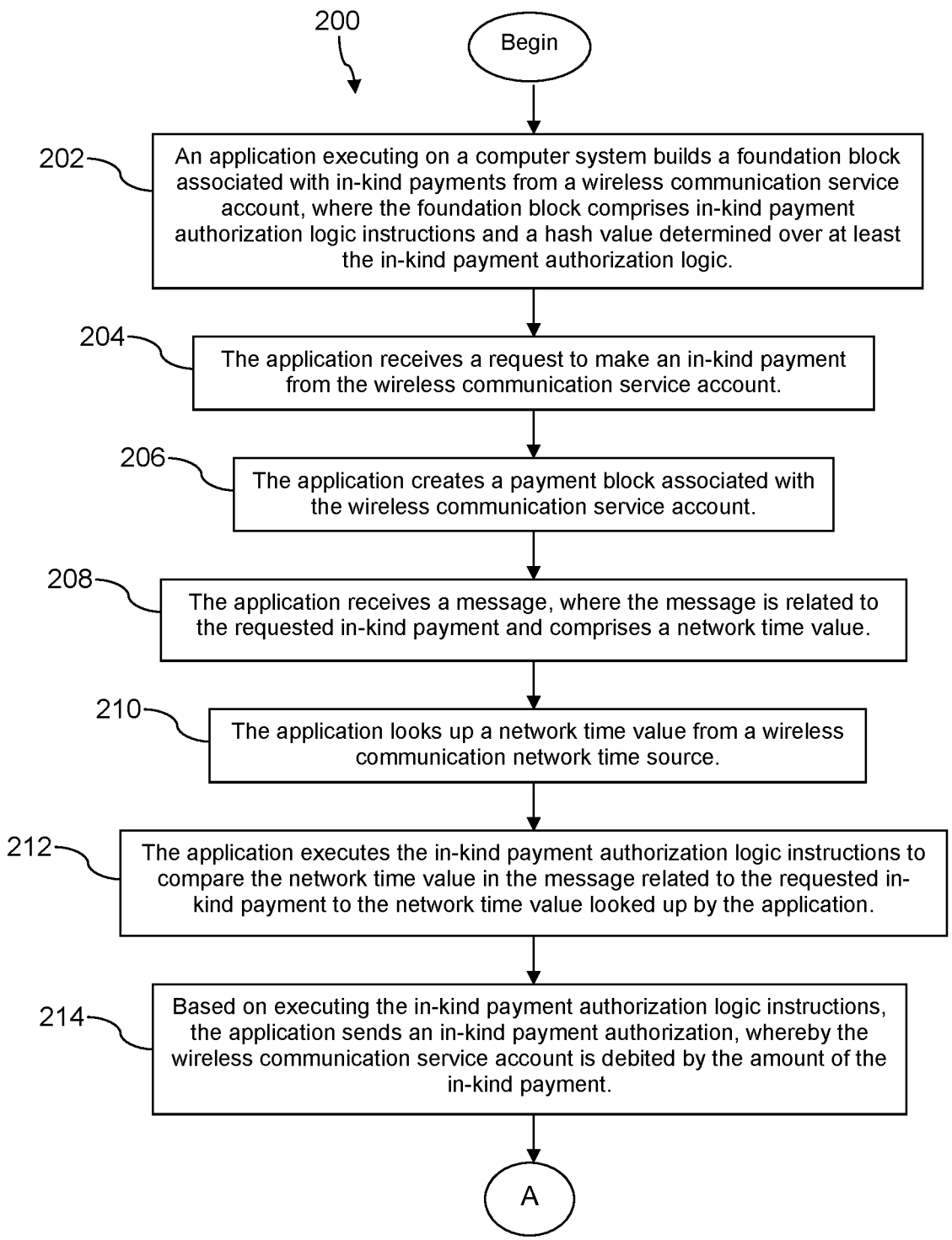
FIG. 4A and FIG. 4B is a flow chart of a method according to an embodiment of the disclosure.
Figure 4B:
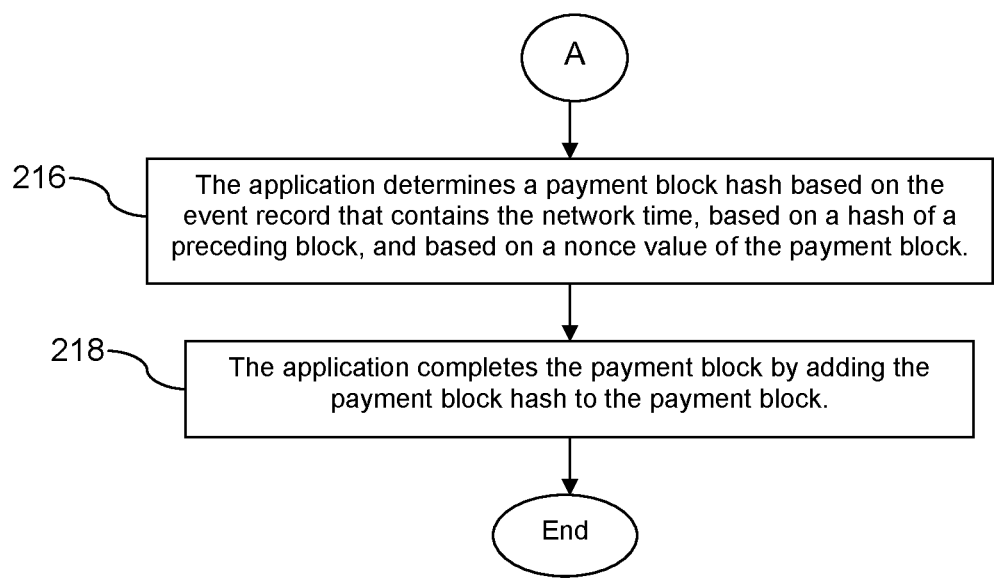

Turning now to FIG. 4A and FIG. 4B, a method 200 is described. At block 202, an application executing on a computer system builds a foundation block associated with in-kind payments from a wireless communication service account, where the foundation block comprises in-kind payment authorization logic instructions and a hash value determined over at least the in-kind payment authorization logic. The foundation block may be implemented as the foundation block 152 described above. The in-kind payment authorization logic may be created based on configuration inputs received from a mobile communication device associated with the wireless communication service account. The in-kind payment authorization logic may be created based in part on rules defined by a wireless communication service provider, for example based on rules defined according to a service plan defined for the wireless communication service account. For example, the service plan may define a limited number of in-kind payments that can be completed per unit of time, for example three in-kind payments per day, three in-kind payments per week, three in-kind payments per month, or some other limit. The service plan may define a maximum value per in-kind payment, for example $5 per in-kind payment, $15 per in-kind payment, $50 per in-kind payment, or some other value limitation. Alternatively, limits may be defined by input received from the mobile communication device, for example received from the in-kind payment client application 104.

At block 204, the application receives a request to make an in-kind payment from the wireless communication service account. At block 206, the application creates a payment block associated with the wireless communication service account. Creating the payment block may be an initial step of extending the block-chain and may not at first involve attaching the in-progress payment block to the block-chain. The payment block may be progressively built and constructed in response to a plurality of received message containing event information from the mobile communication device or from other entities involved in the in-kind payment transaction. Each received message may be associated with addition of an event information 162 as described above with reference to FIG. 3.

At block 208, the application receives a message, where the message is related to the requested in-kind payment and comprises a network time value. At block 210, the application looks up a network time value from a wireless communication network time source. The application may add an event information to the in-progress payment block. The application may determine an epoch time and add the epoch time to the event information. The application may add the looked-up network time to the event information. The application may add the network time value provided in the received message to the event information. The application includes event data in the event information.

At block 212, the application executes the in-kind payment authorization logic instructions to compare the network time value in the message related to the requested in-kind payment to the network time value looked up by the application. The application may further execute the in-kind payment authorization logic to authorize in-kind payment from the wireless communication service account. For example, the application may check the requested in-kind payment against predefined limits such as a maximum number of in-kind payments per unit of time and/or a maximum value amount for any in-kind payment. The application may check that the in-kind payment is directed to a predefined destination, such as a predefined phone number, a predefined utility account, a predefined city, a predefined country.

At block 214, based on executing the in-kind payment authorization logic instructions, the application sends an in-kind payment authorization, whereby the wireless communication service account is debited by the amount of the in-kind payment. At block 216, the application determines a payment block hash based on the event record that contains the network time, based on a hash of a preceding block, and based on a nonce value of the payment block. For example, a hash value is computed according to an MD5 hash algorithm, an SHA-1 algorithm, an SHA-2 algorithm, or some other hashing algorithm, using the hash of the preceding block, the nonce of the payment block, and one or more event informations (including the network time) as input to the hashing algorithm. At block 218, the application completes the payment block by adding the payment block hash to the payment block.

The block-chain progressively build over time using method 200 may be read by the in-kind payment server application 122. For example, the in-kind payment server application 122 may read the block-chain 150 out of the data store 124 in the context of a dispute over the balance of the wireless communication service account. The dispute may be related to a fraud that has been practiced whereby malware or a hacker spoofs the mobile communication device and transfers in-kind payments with the authorization of the true subscriber associated with the wireless communication service account. The analysis of the block-chain 150 may promote taking steps to thwart future fraud of this kind. The analysis of the block-chain 150 may promote recording in-kind payment transactions that a subscriber has forgotten.

Building the block-chain may comprise building a foundation block 152 that comprises logic instructions, for example in-kind payment authorization logic instructions or other logic instructions related to in-kind payment transactions. The application may receive logic revision requests and revise the logic instructions accordingly. Subsequently received requests to make an in-kind payment from a mobile communication device may be evaluated based on the revised logic instructions.

Figure 5:
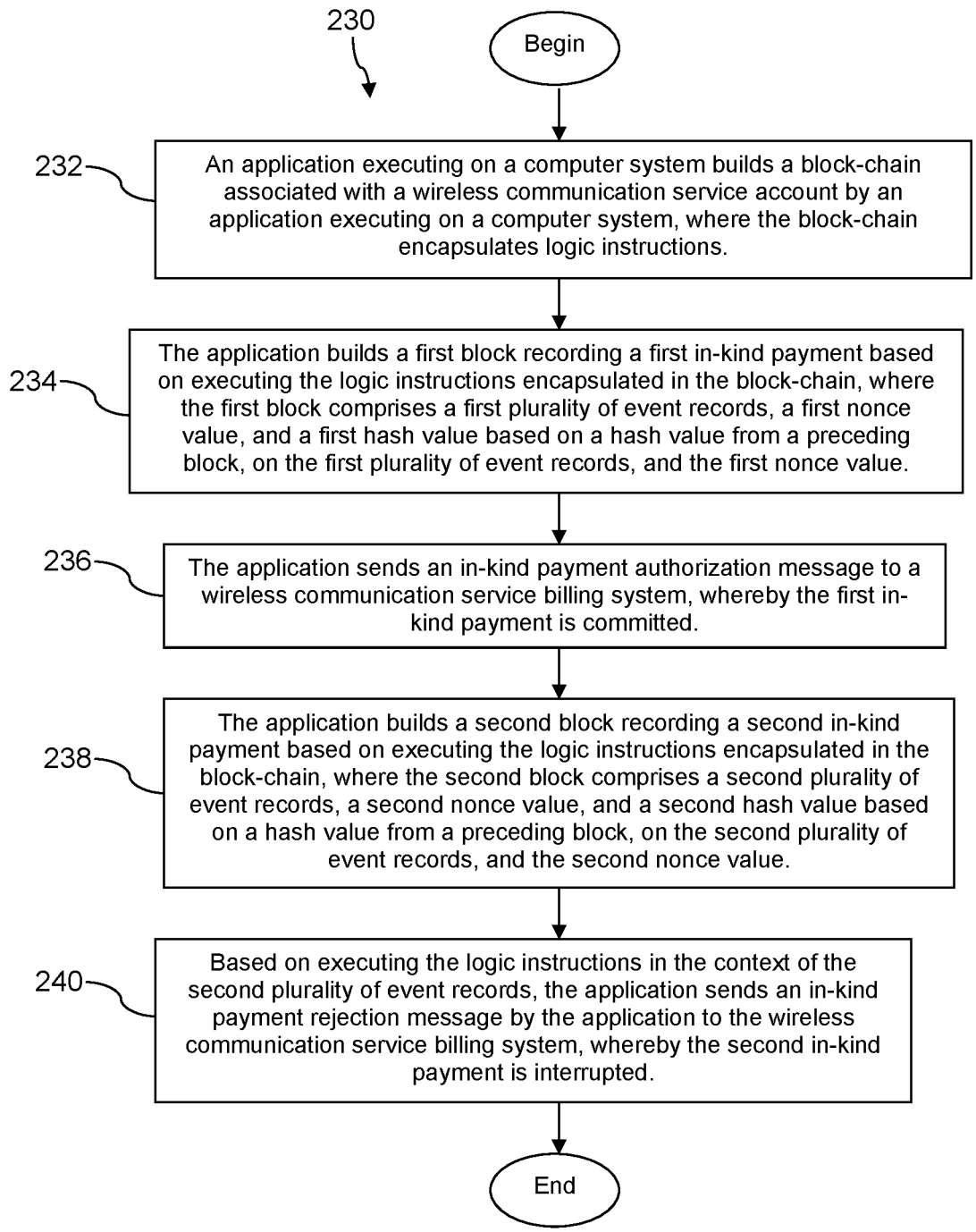
FIG. 5 is a flow chart of another method according to an embodiment of the disclosure.

Turning now to FIG. 5, a method 230 is described. At block 232, an application executing on a computer system builds a block-chain associated with a wireless communication service account by an application executing on a computer system, where the block-chain encapsulates logic instructions. At block 234, the application builds a first block recording a first in-kind payment based on executing the logic instructions encapsulated in the block-chain, where the first block comprises a first plurality of event records, a first nonce value, and a first hash value based on a hash value from a preceding block, on the first plurality of event records, and the first nonce value.

At block 236, the application sends an in-kind payment authorization message to a wireless communication service billing system, whereby the first in-kind payment is committed. At block 238, the application builds a second block recording a second in-kind payment based on executing the logic instructions encapsulated in the block-chain, where the second block comprises a second plurality of event records, a second nonce value, and a second hash value based on a hash value from a preceding block, on the second plurality of event records, and the second nonce value. At block 240, based on executing the logic instructions in the context of the second plurality of event records, the application sends an in-kind payment rejection message by the application to the wireless communication service billing system, whereby the second in-kind payment is interrupted.

Figure 6:
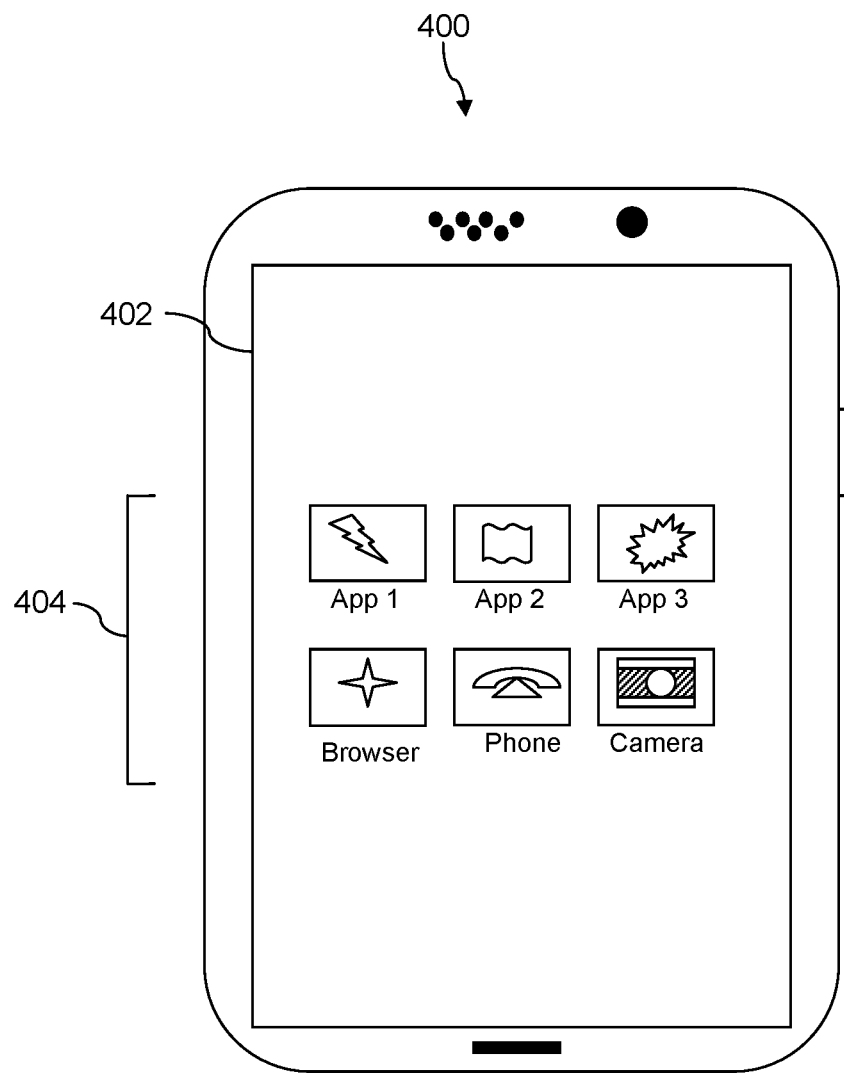
FIG. 6 is an illustration of a mobile communication device according to an embodiment of the disclosure.

FIG. 6 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 7:
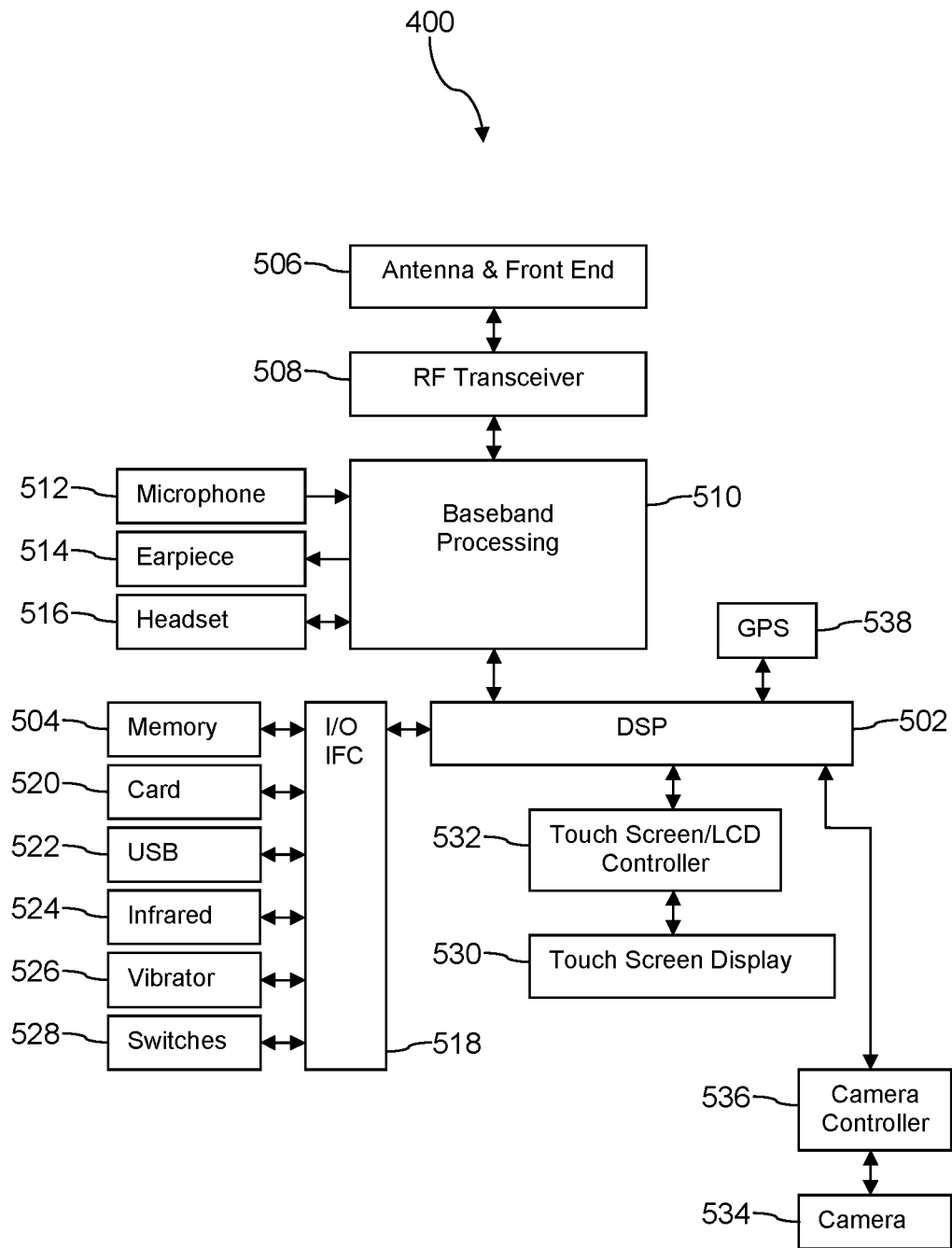
FIG. 7 is a block diagram of a hardware architecture of a mobile communication device according to an embodiment of the disclosure.

FIG. 7 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 8A:
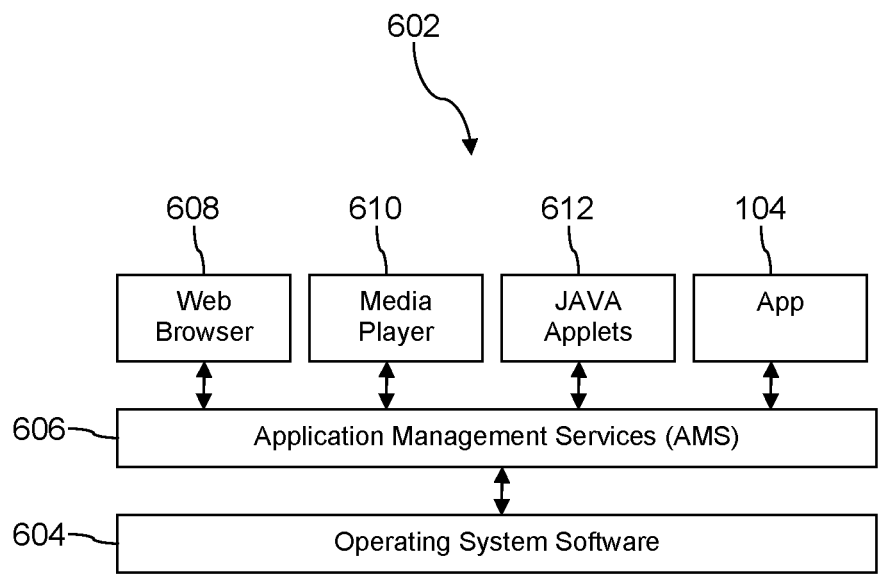
FIG. 8A is a block diagram of a software architecture of a mobile communication device according to an embodiment of the disclosure.

FIG. 8A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 8A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 8B:
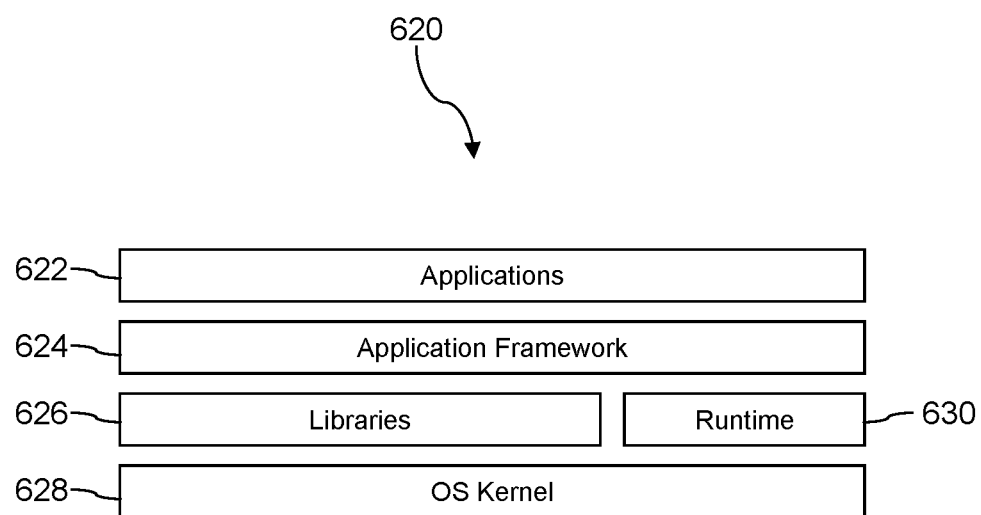
FIG. 8B is a block diagram of another software architecture of a mobile communication device according to an embodiment of the disclosure.

FIG. 8B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 9:
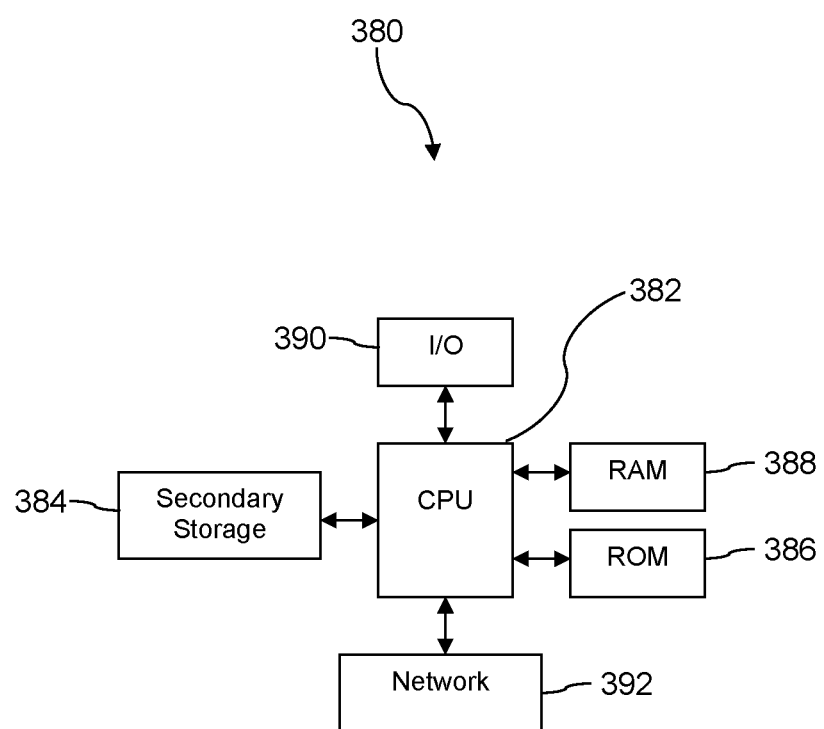
FIG. 9 is a block diagram of a computer system according to an embodiment of the disclosure.

FIG. 9 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of recording in-kind payments from a wireless communication service account, comprising:
    building, by an application executing on a computer system, a foundation block of a block chain associated with in-kind payments from the wireless communication service account, where the foundation block is a first block of the block chain and comprises in-kind payment authorization logic instructions and a hash value determined over at least the in-kind payment authorization logic;
    receiving a request to make an in-kind payment from the wireless communication service account by the application;
    creating a payment block of the block chain, associated with the wireless communication service account by the application;
    receiving a message by the application, where the message is related to the requested in-kind payment and comprises a network time value;
    looking up a network time value by the application from a wireless communication network time source, wherein the network time value is a computer-generated time value unique to a communication service provider that provides the wireless communication service account;
    comparing the network time value in the message related to the requested in-kind payment to the network time value looked up by the application by executing the in-kind payment authorization logic instructions of the foundation block, wherein the in-kind payment authorization logic instructions included in the foundation block instruct the computer system to compare the network time value in the message related to the requested in-kind payment to the network time value looked up by the application, and wherein the computer system determines that the requested in-kind payment is authorized when the network time value in the message related to the requested in-kind payment is in agreement with the network time value looked up by the application;
    based on executing the in-kind payment authorization logic instructions of the foundation block and when the requested in-kind payment is determined to be authorized, sending an in-kind payment authorization by the application, whereby the wireless communication service account is debited by the amount of the in-kind payment;
    determining a payment block hash by the application based on the event record that contains the network time, based on a hash of a preceding block of the block chain, and based on a nonce value of the payment block of the block chain; and
    completing the payment block of the block chain by adding the payment block hash to the payment block of the block chain, by the application.

2. The method of claim 1, further comprising executing the in-kind payment authorization logic instructions by the application to authorize in-kind payment from the wireless communication service account.

3. The method of claim 1, wherein the first mobile communication device is one of a mobile phone, a smart phone, a personal digital assistant (PDA), a headset computer, a wearable computer, a laptop computer, a notebook computer, or a tablet computer.

4. The method of claim 1, wherein the first mobile communication device is provided a wireless communication link by the first wireless communication service provider according to a long term evolution (LTE), a code division multiple access (CDMA), a global system for mobile communication (GSM), or a worldwide interoperability for microwave access (WiMAX) wireless communication protocol.

5. The method of claim 1, wherein the network time is different from epoch time.

6. The method of claim 1, further comprising adding an event information into the payment block wherein the event information comprises event data and the network time.

7. The method of claim 6, wherein the event information added to the payment block further comprises an epoch time.

8. A computer system, comprising:
    a processor;
    a non-transitory memory; and
    an application stored in the non-transitory memory that, when executed by the processor:
        builds a foundation block of a block chain associated with in-kind payments from a wireless communication service account, where the foundation block is a first block of the block chain and comprises in-kind payment authorization logic instructions and a hash value determined over at least the in-kind payment authorization logic;
        receives a request to make an in-kind payment from the wireless communication service account;
        creates a payment block of the block chain, associated with the wireless communication service account;
        executes the in-kind payment authorization logic instructions of the foundation block, where the in-kind payment authorization logic instructions identify conditions of in-kind payment actions when network time is to be captured and identify conditions for authorizing in-kind payment from the wireless communication service account, wherein the in-kind payment authorization logic instructions included in the foundation block instruct the computer system to compare the network time value in the message related to the requested in-kind payment to the network time value looked up by the application, and wherein the computer system determines that the requested in-kind payment is authorized when the network time value in the message related to the requested in-kind payment is in agreement with the network time value looked up by the application;
        based on executing the in-kind payment authorization logic instructions of the foundation block and when the requested in-kind payment is determined to be authorized, looks up a network time from a wireless communication network time source, wherein the network time value is a computer-generated time value unique to a communication service provider that provides the wireless communication service account;

adds the network time to an event record of the payment block of the block chain;

sends an in-kind payment authorization, whereby the wireless communication service account is debited by the amount of the in-kind payment;

determines a payment block hash based on the event record that contains the network time, based on a hash of a preceding block of the block chain, and based on a nonce value of the payment block of the block chain; and completes the payment block of the block chain by adding the payment block hash to the payment block of the block chain, whereby the application records in-kind payments from a wireless communication service account.

9. The computer system of claim 8, where the request to make the in-kind payment is received from one of a mobile phone, a smart phone, a personal digital assistant (PDA), a headset computer, a wearable computer, a laptop computer, a notebook computer, or a tablet computer.

10. The computer system of claim 8, wherein the application further compares a network time stored in the request to make the in-kind payment to the looked-up network time.

11. The computer system of claim 8, wherein the application builds foundation blocks and payment blocks associated with a plurality of different wireless communication service accounts.

12. The computer system of claim 8, wherein executing the in-kind payment authorization logic instructions comprises comparing a designated amount of in-kind payment value to a limit defined for the wireless communication service account.

13. The computer system of claim 8, wherein executing the in-kind payment authorization logic instructions comprises determining how many in-kind payments have been made from the wireless communication service account over a current time window.

\* \* \* \* \*